Patented Dec. 3, 1935

2,022,798

UNITED STATES PATENT OFFICE 2,022,798

MANUFACTURE OF COATED ALUMINUM ARTICLES

Helmer Bengston, Indianapolis, Ind., assignor to Aluminum Colors Incorporated, Indianapolis, Ind., a corporation of Delaware No Drawing. Application May 13, 1931, Serial No. 537,221. Renewed January 15, 1935

7 Claims. (Cl. 29—148)

This invention relates to manufacture of coated aluminum articles; and it comprises an article of aluminum or aluminum alloy surfaced with a porous anode coating, having within its pores precipitated pigment, the said pigment comprising the products of a chemical reaction carried out within said pores and capable of decorating and protecting said coating; and it also comprises a process of impregnating a porous anode coating, advantageously produced in a solution of sulfuric acid, of a concentration of 60 to 77 per cent, for example, with chemicals capable of producing pigments upon chemical reaction and thereafter causing the said chemical reaction to take place within the pores of the said coating; all as more fully hereinafter set forth and as claimed.

Aluminum after exposure to the air is always covered by an excessively thin coating or film to which it owes its resistance to corrosion and atmospheric influences. The coating is probably mainly oxid, though it always contains some nitrogen and $H_2O$. Being wholly impervious, the coating is very thin. When it is removed by abrasion, it is renewed at once by the action of the air. Its presence renders difficult the use of the ordinary ways of decorating by plating, etc. Further, it does not give a good cohesive union with paint and varnish. For these reasons, aluminum is rarely decorated in any way.

When aluminum is made an anode in most aqueous liquids, current at first flows and then stops, gradually or suddenly, as the case may be. This phenomenon is utilized in rectifying alternating currents. As a bath, a solution of borax or sodium phosphate is generally used, although most soluble salts, except chloride and bromids, are applicable, as are most of the oxygen acids. Cessation of current flow occurs when surface oxidation, at the expense of the aluminum metal, produces a sufficiently non-conducting film or layer. Naturally, the more impervious the film, the sooner the attack on the metal ceases; and the thinner is the film. The actual thickness varies considerably with conditions (voltage, electrolyte, temperature, etc.), ranging from a practically impervious film of no ascertainable thickness to highly porous coatings several thousandths of an inch thick. In the latter coatings, the pores are very small, being microscopic or submicroscopic in size, but in the aggregate they may constitute 40 per cent of the total volume of the coat.

The use of these anode coatings for practical purposes has been proposed. The very thin, quite impervious films, such as are formed by heating aluminum in the air either with or without a preliminary chemical treatment, are of no utility in the present invention, being no better than the natural air-produced film on aluminum. Such films are not porous. Like the natural film, they are too thin to permit mechanical work, such as buffing or polishing. The thicker porous coatings, although pervious, can be made to protect the aluminum by the expedient of filling the pores with oil or grease; and in some cases, they are of excellent mechanical properties as regards hardness. When thick enough, they resist buffing and polishing. In buffing, using the ordinary buffing compounds, sufficient grease may be taken up to close the pores. Good coatings of substantial thickness are usually gray and translucent. Some aluminum alloys give coatings which are quite gray. Filled with oil, the appearance changes somewhat; the change, of course, depending upon the amount of oil and its character. Good quality, oil-filled coatings have what may be called a dull finish; the original brightness of the aluminum having been replaced by a sort of satin finish. Sometimes this is wanted and sometimes, not. The coatings may, however, be given a coloration in any hue wanted by the use of suitable anilin dyes; all sorts of delicate and attractive pastel shades being possible. Even thin coatings may be dyed, since the dye combines with any oxid present and is not dependent upon the presence of pores in the coat. Unfortunately, even with the best of these dyes, in exposed situations the fastness is not as great as could be wished. On exposure to sunlight, the action of the actinic rays is reinforced by the reflection from the underlying metal.

The present application is a continuation in part of my copending application Serial No. 460,543, filed June 11, 1930, now Patent No. 1,869,041. In my copending application the precipitation of inorganic pigments within the pores of an anodic coating is described but not clamed, the case being directed especially to an anodically coated article, the pores of which may be filled with impregnating matter or the coating being dyed. The present application is directed to anodically coated aluminum articles colored by the presence of a pigment precipitated within the pores of its coating, this pigment comprising the decomposition products of a chemical, and to processes of producing the said coated article.

In the present invention, the volume of the pores of the anode coating is lessened, reflection from the under metal lessened, and the appearance changed by producing insoluble precipitated materials or pigments in such pores; generally, by metathetical reaction. By "pigment" is meant solid precipitated material, usually inorganic in nature, which is not chemically combined with the coating but merely plugs the pores. I do not include in this term such dyes as form "lakes" with the anode coatings. My "pigments" are light fast while the dyes are not. The precipitate may be colored and consist of lightfast inorganic or organic material; or it may be colorless; in which event a white effect is produced. The article is finally oiled, buffed and polished. To the extent that the pores are charged wth precipitated matter, the volume of oil required is reduced; and the reduction is usually substantial. This produces a better final article. Where the precipitate is white, the coating may take a porcelain-like appearance.

The coating treated in the present invention may be made in any of the ways proposed, provided they are thick enough to have substantial mechanical strength. It is possible to use phosphates, borates, tungstates, etc. The sodium salts are suitable. Most of the acids, excepting the halogen acids, can be used. Sulfuric, chromic and phosphoric acids all give coating of greater or less merit, depending upon the concentration, voltage and other conditions. The organic acids, acetic, tartaric, citric, etc., may also be used.

Advantageous coatings can be made in sulfuric acid. While sulfuric acid of various strengths may be used, there are two ranged which produce particularly good results (1) between 15 and 35 per cent $H_2SO_4$ and (2) between 60 and 77 per cent concentration. The best results are, respectively at 25 and 64–65 per cent. With either range, passage of current with the article made an anode and with a voltage of about 10 to 15, gives a hard, resistant coating desirable for many purposes. The two coatings are, however, specifically different, each being adapted for special purposes.

However, other pervious coatings of a mechanically desirable type may be made with the use of other baths; and other ranges of sulfuric acid may be satisfactorily employed with a variation in conditions. In the sulfuric acid baths, for example, the presence of various organic materials is frequently useful. With the 60–77 per cent range, an addition of glycerin, cresol, etc., often gives better results. These bodies form sulfonic acids and the sulfonic acids themselves may be used in lieu of adding cresol, etc., to sulfuric acid.

In one embodiment of the present invention using an anode coating made in the stronger range of sulfuric acid and containing possibly combined $SO_3$, the anode coating is slightly washed to remove most of the free sulfuric acid from the anode bath and is then ready for impregnation. If the coating has been allowed to dry for any reason the article is advantageously heated to drive the air from the pores before impregnation. A simple dip in lead acetate solution will form a precipitate of lead sulfate by reaction with the sulfuric acid remaining in the pores, giving a porcelain-like appearance. A dip in a chromate solution, such as sodium chromate, followed by a dip in a solution of a lead salt will produce a bright yellow precipitate of lead chromate within the pores. Several dips in the solutions may be required. Rinsing between dips produces a more uniform or level appearance.

The hue of the chromate varies according to the pH at the time of precipitation and may be anywhere from a full yellow or orange to a pale yellow hue. In coatings made with other baths than sulfuric acid, formation of lead sulfate does not occur. In a coating made with a $CrO_3$ bath, after the anode coating operation, the article, without washing, may be directly treated with lead acetate, thereby producing lead chromate in the pores.

Articles made in any of the ways just described are finally dried, buffed and polished, being filled with oil as a separate operation, if this is deemed desirable. Petrolatum, lanolin and most other permanent oily bodies may be used. Melted wax may be employed. The coating is resistant to heat and I sometimes bake it after coloring; thereby producing changes in hue in the deposited matter. As a final operation, I nearly always buff and polish mechanically.

In another modification of my invention, the coating is impregnated with $CrO_3$ solution, somewhat dried and the $CrO_3$ reduced by exposure to sulfur dioxid or other reducing gases; the reduction going as far as may be desired. Cathode reduction may also be employed. Slight reduction gives buffs and browns and complete reduction, greenish tints. In the case of articles coated in a $CrO_3$ bath, the coated material may not be washed, the $CrO_3$ in the pores being often sufficient for my purposes.

A simple method of producing brown colors approaching black is to introduce substances into the pores which will liberate carbon on reduction by heating or chemical reaction. These substances include sugars, oils and many other organic materials.

In another way of filling the pores, particularly adapted for articles to be varnished or lacquered, the washed coating is treated with sodium resinate. In the case of coatings containing subsulfate, this forms aluminum resinate in the pores. With other articles, some aluminum resinate is probably also formed in the pores, but I advantageously follow in this case with a solution of a salt forming an insoluble resinate. Aluminum sulfate may be employed. Copper sulfate, zinc sulfate, cadmium sulfate, cobalt sulfate, etc., etc., may be used. These salts may also be used with resinate-treated sulfuric acid coatings.

White effects may be produced by treating the coating with barium nitrate followed, if necessary, by a sulfate. Blue may be produced by making Prussian blue in the pores with an iron salt and ferro or ferri cyanid.

Greens may be produced by precipitation of copper salts within the pores, Paris green, for example. Ferro cyanid of copper gives a red hue. The number of precipitates which can be produced in the pores is, in fact, only limited by the possibilities of inorganic chemistry.

In the specific embodiment of this invention producing decorated and protected sheet aluminum which may be stamped into bottle caps, ash trays, etc. etc., a sheet of aluminum, or of any of the commercial aluminum alloys, is made an anode in a 64–65 per cent solution of $H_2SO_4$ and a voltage of about 12 volts applied, the cathode being a lead plate. There is a surge of current which drops off during the coating operation. At a temperature of about 25° C., the article is covered with a coating of about 0.0004 inch in thickness within 15 to 20 minutes. The coated article is removed and washed. It is then plunged into a concentrated solution of lead acetate. This results in the formation of lead sulfate in the pores and, because of a difference in refraction, the original gray translucent appearance changes to a pearly translucency. The coating is rinsed after the lead acetate dip, dried and buffed and polished by the usual means. It may then be stamped into the final form desired. The coating resists flexure sufficiently well to permit stamping and punching. Before or after manufacture, the pores may be filled with petrolatum or any other neutral permanent oil, in the event that buffing does not add sufficient grease.

Articles of a yellow, pearly translucency may be made by giving the coating a dip in a 10 per cent sodium chromate solution after the lead acetate dip. After this chromate dip, the coating is washed and treated as before. A blue of any desired shade may be given the coating by impregnating with ferrous sulfate solution, rinsing and dipping in a ferricyanid solution; afterwards washing, drying and polishing as before.

What I claim is:—

1. In the decoration and protection of aluminum articles, the process which comprises making the article anode in a bath containing sulphuric acid until a substantial porous coating is formed, said bath having an acid concentration ranging from about 60 to 77 per cent; and thereafter impregnating said coating with chemicals capable of producing a light-fast inorganic pigment by chemical reaction and precipitating said pigment in the pores of said coating.

2. A stamped article of aluminum surfaced with a substantial porous, intact, anode coating having a light-fast inorganic pigment precipitated within its pores and having the characteristics of a coating formed in a sulfuric acid bath of a concentration ranging from 60 to 77 per cent by weight; the article having been stamped subsequent to coating.

3. In the production of decorated and protected aluminum coatings on articles, the process which comprises making sheet aluminum an anode in a bath containing sulfuric acid of a concentration ranging from about 60 to 77 per cent by weight, thereafter precipitating a light-fast inorganic pigment within the pores of said article and subsequently stamping and working the same into a finished article.

4. The process of producing decorated and protected aluminum articles which comprises making sheet aluminum an anode in sulfuric acid of a concentration ranging from about 60 to 77 per cent, until a thick coating forms, removing the plate from the bath and washing and drying said coating, impregnating the pores of said coating with a material capable of chemical reaction to produce a light-fast precipitate of different optical properties from the material of the coating, thereafter causing said chemical reaction to take place thereby producing said light-fast precipitate within said pores, buffing and polishing the plate and stamping into form, the pores being finally filled with oil.

5. In the decoration and protection of anode coatings on aluminum, the process which comprises producing a porous, anodic coating of substantial thickness on aluminum, thereafter impregnating said coating with chemicals capable of producing light-fast, inorganic pigments upon chemical reaction, and causing the said chemical reaction to take place within the pores of said coating, thereby precipitating said inorganic pigments within said pores.

6. In the decoration and protection of porous anode coatings on aluminum, the process which comprises producing a porous, anodic coating of substantial thickness on aluminum, thereafter carrying out a metathetical reaction within the pores of said coating, the said reaction being such as will result in an insoluble, light-fast, inorganic, precipitate being produced within said pores.

7. In the decoration and protection of anode coatings on aluminum, the process which comprises producing a porous, anodic coating of substantial thickness on aluminum, thereafter impregnating the said coating with chemicals capable of producing light-fast, inorganic pigments by chemical decomposition and subsequently decomposing said chemicals whereby the said pigment is produced within the pores of said coatings.

HELMER BENGSTON.